March 21, 1950
D. K. DEAN
2,500,934
APPARATUS FOR THE STRIPPING OF VOLATILES FROM FLUIDS
Filed April 2, 1943
2 Sheets-Sheet 1
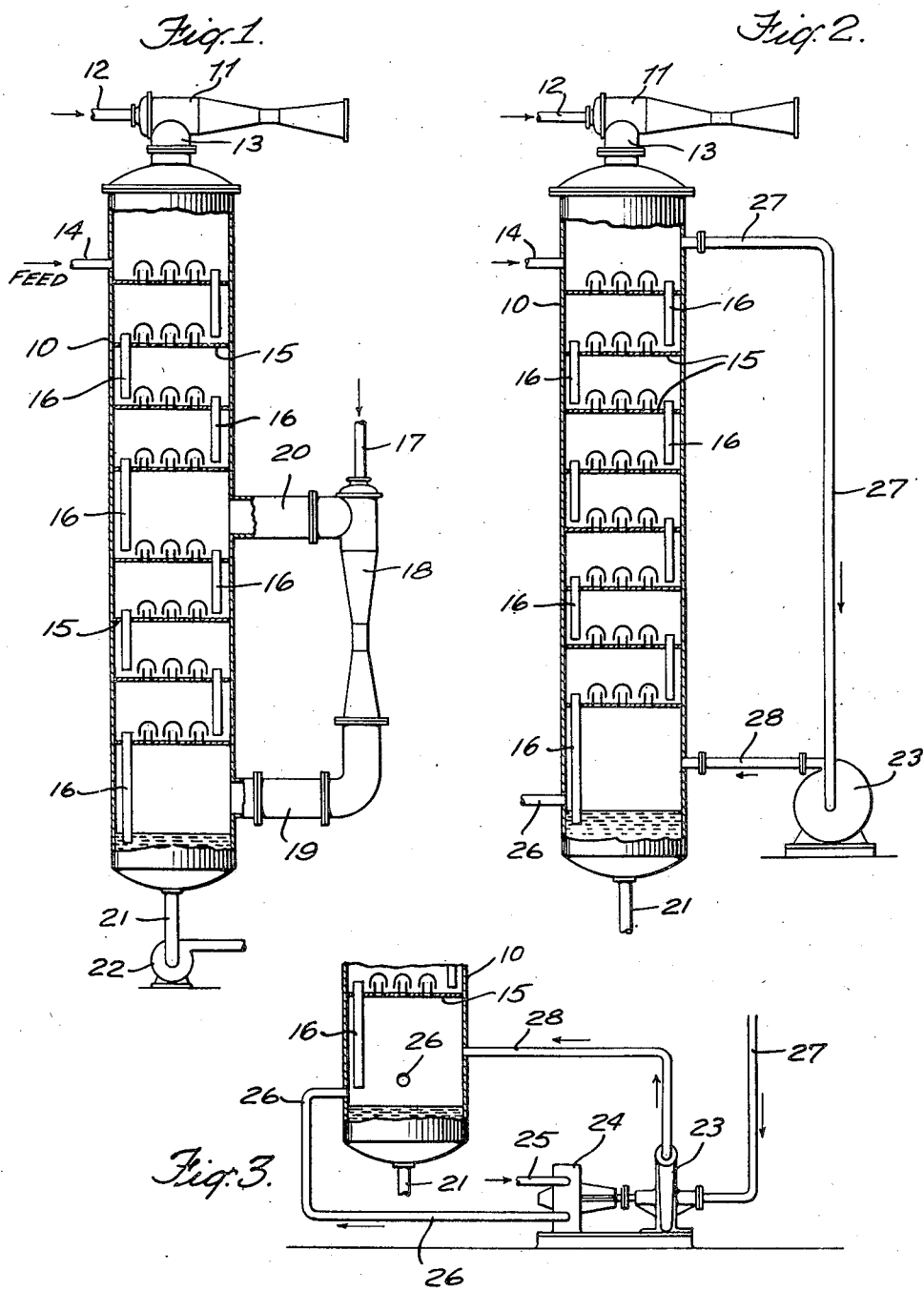
INVENTOR
DION K. DEAN.
BY
ATTORNEY March 21, 1950      D. K. DEAN      2,500,934
APPARATUS FOR THE STRIPPING
OF VOLATILES FROM FLUIDS Filed April 2, 1943      2 Sheets-Sheet 2

INVENTOR
DION K. DEAN.
BY
ATTORNEY

Patented Mar. 21, 1950

2,500,934

UNITED STATES PATENT OFFICE 2,500,934

APPARATUS FOR THE STRIPPING OF VOLATILES FROM FLUIDS

Dion K. Dean, Rahway, N. J., assignor to Foster Wheeler Corporation, New York, N. Y., a corporation of New York Application April 2, 1943, Serial No. 481,590

17 Claims. (Cl. 261—114)

This invention relates generally to the art of stripping volatiles from a fluid, and more particularly pertains to apparatus for deodorization of animal oils and vegetable oils, such as cotton seed oil, corn oil, cocoanut oil and the like. The deodorization of such oils is mainly for the purpose of producing edible products, although not necessarily limited thereto, by the removal from the raw oil free fatty acids and other undesirable volatile substances that would otherwise adversely effect the product with respect to color and taste, or cause rapid deterioration.

It is customary in stripping volatiles from a fluid, for example, in deodorizing vegetable oils, to use a stripping or deodorizing tower into which the oil is introduced at the upper part thereof and is thereupon normally subjected to the desired operating vacuum. The oil flows downwardly over a plurality of bubble trays countercurrent to and in contact with stripping steam introduced into the tower at the lower portion thereof. The finished product is removed from the bottom of the tower while the steam and vapor and uncondensible gases are removed from the upper part of the tower. The degree to which a given amount of stripping steam is saturated with undesirable volatile substances contained in the liquid in the bubble trays is dependent upon the volume of steam passed through the liquid. The greater the volume of steam passing through a bubble tray the greater is the amount of undesirable volatile substances absorbed by the steam. In the tower, there is usually a full vacuum provided in the upper part thereof to cause the flow of steam therethrough but there is a pressure drop successively through the trays from the upper tray downwardly, with the result that in a given amount of stripping steam introduced into the tower there is an appreciable reduction of the volume of steam passing through each successive tower tray from the upper tray downwardly and therefore a reduction in the effectiveness of the lower trays. It is not possible therefore, in the usual process of deodorizing vegetable oils or removing a volatile substance from another fluid to attain a uniformly high degree of the stripping effect of the steam used throughout the several trays. For example, the probable effectiveness of the bottom tray of a tower may be as low as from 25% to 30% of the effectiveness of the uppermost tray. It is also usual in present towers to use as a stripping medium, steam under pressure from a steam generator used to generate steam for various other parts of oil refining or other apparatus, in which there is an appreciable amount of energy not utilized either before or after it is passed from the tower.

The present invention overcomes these disadvantages of the prior practice, by recycling the stripping steam through the tower and distributing it therein so that a substantially greater volume of stripping steam is passed through the vapor and liquid contact devices without increasing the amount of steam fed to the tower. The invention also provides apparatus by means of which the energy of the stripping steam is utilized to increase the volume of steam passing through the contact devices.

For a better understanding of the particular features that characterize the invention, reference may be had to the following description when considered in connection with the accompanying drawings in which:

Fig. 1 is a vertical sectional view with part in elevation, illustrating diagrammatically one form of the invention;

Fig. 2 is a view similar to Fig. 1 showing another form of the invention;

Fig. 3 is a view similar to Fig. 2 showing a further form of the invention; and

Like characters of reference refer to like parts throughout the several views.

Figure 4:
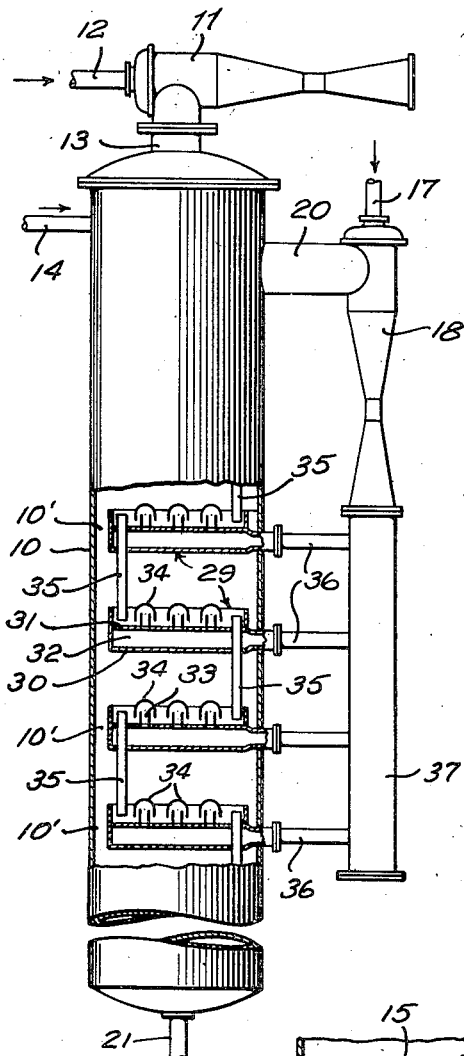
Figs. 4, 5 and 6 are views similar to Fig. 1, but illustrating a further form of the invention.

Referring to the form of the invention shown in Fig. 1, the reference character 10 designates a deodorizing tower in which is maintained a high vacuum created by a thermo-compressor 11 connected with a steam supply through a conduit 12. The thermo-compressor is in communication with the tower through its suction 13. As shown, the thermo-compressor is mounted on top of the tower and usually would discharge into a high vacuum condenser, not shown. Oil to be deodorized is fed into the upper part of the tower 10 through a feed pipe 14 and flows downwardly over a plurality of vertically spaced bubble trays 15. The bubble trays 15 have downcomers 16, and each bubble tray is co-extensive in area with the inside diameter of the tower. Stripping medium, such as steam, is conducted to the tower 10 through a conduit 17 which is connected to a recycling thermo-compressor 18 and enters the tower below the lowermost bubble tray 15 through conduit 19, thereafter passing upwardly through the bubble trays 15 serially, countercurrent to and in contact with the oil flowing downwardly. The suction side of the recycling thermo-compressor 18 as shown, is in communication with the tower 10 through a conduit 20 at a point substantially intermediate the ends of the tower. The conduit 29 may however, be connected to the tower at any desirable point above the lowermost tray in the tower 10. The deodorized oil is withdrawn from the bottom of the tower through a conduit 21 by a removal pump 22.

In operation, oil or other fluid from which the volatiles are to be removed, enters the tower through the conduit 14 and passes downwardly over the bubble trays 15 countercurrent to and in contact with the stripping steam which enters the tower through the conduit 19 and flows upwardly through the bubble trays, due to the vacuum created in the tower by the thermo-compressor 11. Means other than the thermo-compressor 11 may be used to cause the stripping steam to flow through the column. The stripping steam absorbs the undesirable volatile elements in the oil or other fluids. A portion of the stripping steam is recycled through the tower, passing through the conduit 20, thermo-compressor 18 where it is recompressed, thence through the conduit 19 back into the tower, thence upwardly over the bubble trays. The efficiency of the bubble trays 15 below the level of the conduit 20, which ordinarily would be decreased due to the pressure drop through the trays from the top of the tower downwardly which causes a decreased volume of steam to be passed over these trays, is increased without increasing the volume of steam fed to the tower, since the oil or other fluid passing through these trays is brought into contact with a greater volume of stripping steam in consequence of the recycling feature. The increased volume of stripping steam in the zones of lower pressure causes a greater amount of the undesirable volatile substances to be removed from the oil in these zones. This results in a greater overall efficiency of the tower.

The apparatus illustrated in Fig. 2 is similar to that shown in Fig. 1, excepting that recycling of stripping steam is accomplished by means of a mechanical type compressor 23 driven by any suitable means such as a steam turbine or an electric motor, not shown. The stripping steam is introduced directly into the tower 10 through the line 26. Part of the stripping steam is withdrawn from the top of the tower through the conduit 27 by action of the compressor and is re-introduced into the tower at the lower portion thereof through the conduit 28. The conduit 27 need not necessarily be connected to the tower at the top thereof but may be connected at any point above the lowermost tray. The operation of the apparatus of Fig. 2 is similar to that of the apparatus shown in Fig. 1.

The compressor 23, in the form of the invention shown in Fig. 3, is driven by a steam turbine 24. The turbine 24 is actuated by stripping steam used in the tower 10, the steam entering the turbine through a conduit 25 and flowing to the tower 10 through the turbine exhaust and the conduit 26. The turbine 24 may be actuated by steam which is exhausted to a place other than the tower. In other respects, the form of the invention shown in Fig. 3 is similar to that shown in Fig. 2.

In the form of the invention shown in Fig. 4, the bubble trays 29 extend in a substantially horizontal plane in the tower 10 to a point short of the inner wall thereof, so that a passage 10' is formed which extends from the upper to the lower portion of the tower. The trays are hollow, and comprise a bottom 30 and a top 31 spaced therefrom to form a fluid-tight chamber 32. The chamber 32 is in communication with the interior of the tower through nozzles 33 and bubble caps 34. The bubble trays are provided with downcomers 35. Chamber 32 of each of the trays is in communication through conduits 36 with a stripping steam manifold 37 which receives stripping steam from a steam line 17 through a thermo-compressor 18, the suction line 20 of which is connected to the tower adjacent the top thereof. The conduit 20 may be connected to the tower at any desired point in the tower above the lowermost tray. The tower 10 is subjected to a high vacuum, as in the form of the invention shown in Figs. 1 to 3, by the thermo-compressor 11.

In the operation of the form shown in Fig. 4, stripping steam passes through the conduit 17 and through the thermo-compressor 18 into the manifold 37. From this manifold, the steam flows in parallel through the conduits 36 into the chambers 32 of the bubble trays whence it flows through the nozzles 33 and into contact with the oil or other fluid on the trays 29. The steam with the undesirable volatile substances entrained therein, passes upwardly in the tower through the passage 10' due to the suction of the compressor. The steam is recycled through the tower, through the suction conduit 20, thermo-compressor 18, manifold 37, conduits 36 and the trays 29. Since the trays 29 are connected to the stripping steam manifold 37 in parallel, each tray is under substantially the same steam pressure and there is, therefore, no substantial pressure drop between the trays at the top and bottom of the tower. In consequence, the stripping on all trays takes place under a minimum of pressure. The efficiency of all the bubble trays in the tower is substantially equal, since substantially the same volume of steam passes through each.

Figure 5:
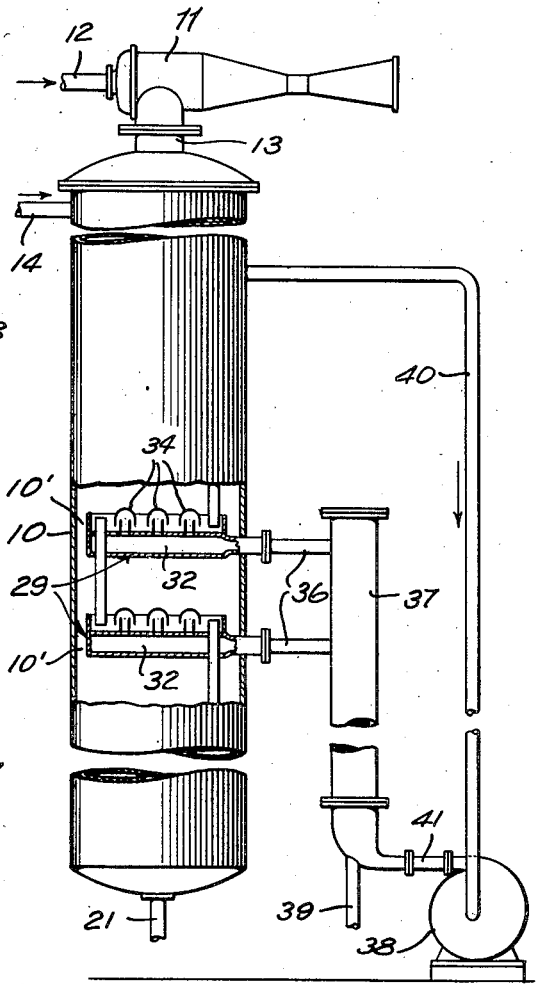

The apparatus illustrated in Fig. 5 is similar to that shown in Fig. 4, with the exception that a mechanical compressor 38 is used to compress and recycle the stripping steam through the tower. The compressor may be driven by a steam turbine actuated by the stripping steam as shown in Fig. 3, or may be driven by other suitable driving means. As shown, stripping steam is introduced into the manifold 37, through the conduit 39, and is passed to the hollow trays 29, which are connected to the manifold 37 in parallel through the conduits 36. Stripping steam is withdrawn from the tower 10 through the conduit 40 by the compressor 38 and is returned to the tower through the conduit 41, manifold 37, conduits 36 and trays 29. The conduit 40 may be connected to the tower at the top thereof, as shown, or at any desired intermediate point. The operation of the apparatus of Fig. 5 is substantially the same as the operation of that of Fig. 4.

Figure 6:
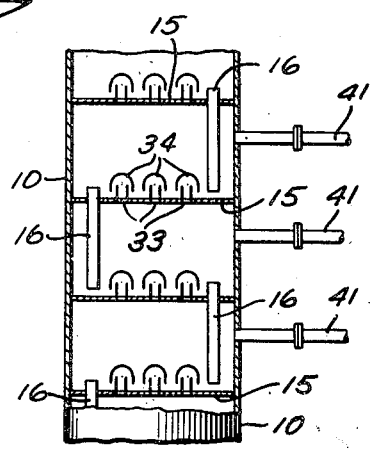

As shown in Fig. 6, the stripping steam may be withdrawn from a plurality of points in the column, if desired, instead of from one point in the tower as shown in Figs. 1, 2, 4 and 5. The steam is withdrawn through the conduits 41 by a thermo-compressor 18, as shown in Figs. 1 and 4, or by a mechanical compressor such as shown in Figs. 2 and 5. The stripping steam thus removed may be recycled through the column as shown in Figs. 1 to 5.

Although vacuum producing apparatus is included in the forms of the invention selected for illustration, such apparatus is not essential and may be omitted if desired. Moreover, the invention is not limited to the countercurrent flow of the stripping medium and the fluid to be stripped in contact with each other, but this contact may be effected in any other desirable manner.

The expression "steam" as used in the specification and claims when applied to the introduction of a stripping medium into the tower, includes within its scope, vapor and gas as well as steam, whether or not it is reactant or non-reactant with respect to the liquid under treatment.

It will be understood that changes may be made in the form, location and relative arrangement of the several parts of the apparatus disclosed, without departing from the principles of the invention. Accordingly, the invention is not to be limited excepting by the scope of the appended claims.

What is claimed is:

1. Apparatus for stripping volatile substances from a liquid comprising a column, vapor and liquid contact devices positioned within the column, means for introducing the liquid to be stripped into the column to pass downwardly through the vapor and liquid contact devices, means for causing stripping steam to pass in contact with the liquid in the liquid contact devices, and recycling means for withdrawing at least a part of the steam from the column at a plurality of points and after passage of the steam through one or more of the contact devices, and for returning the withdrawn steam to the column for contact with the liquid.

2. Apparatus for stripping volatile substances from a liquid comprising a column, means for introducing liquid to be stripped into the column, a compressor having its suction in communication with the column at at least one point above the bottom of the column to withdraw vapor therefrom and its discharge in communication with the column between one of said points and the bottom of the column to discharge said withdrawn vapor into the column, means for driving the compressor, and means for introducing steam into the column to flow in contact with the liquid in the coulmn.

3. Apparatus for stripping volatile substances from a liquid comprising a column, means for continuously introducing liquid to be stripped into the upper part of the column, vapor and liquid contact devices in the column positioned in substantial vertical alignment, a compressor having its suction in communication with the column at at least one point above one of the contact devices to withdraw vapor from the column and its discharge in communication with the column between one of said points and the bottom of the column to discharge said withdrawn vapor into the column, a turbine for driving the compressor, means for conducting steam to the turbine, and means for introducing the steam discharged from the turbine into the column to flow through said contact devices.

4. Apparatus for stripping volatile substances from a liquid comprising a column, means for introducing liquid to be stripped into the upper part of the column, vapor and liquid contact devices so positioned within the column that fluid will flow serially therethrough, means through which steam is passed to the contact devices in parallel, said column having a passage therethrough in which steam flows after passing through the contact devices, and recycling means connected to the column to withdraw at least part of the steam from the column after passage thereof through at least one of the contact devices and to return the steam to said devices to contact the liquid.

5. Apparatus for stripping volatile substances from a liquid comprising a column, means for introducing liquid to be stripped into the upper part of the column, vapor and liquid contact devices having a liquid receiving portion and a steam receiving compartment in communication with the liquid receiving portion and arranged so that the steam in the device will pass in contact with the liquid therein, the vapor and liquid contact devices being positioned within the column and in communication with one another so that the liquid will be received in the liquid receiving portion of one device and passed serially through the liquid receiving portions of the other devices, means through which steam is conducted in parallel to the steam receiving compartments of the contact devices, said column having a passage therethrough in which steam flows after passing through the contact devices, and recycling means for withdrawing at least part of the steam from the column after passage thereof through the contact devices and for returning the steam to said device to contact the liquid.

6. Apparatus for the continuous deodorization of animal and vegetable oils comprising a column, means for producing and maintaining a vacuum in the column, said column having a pressure drop therethrough, means for continuously introducing oil into the upper part of the column, vapor and liquid contact devices having a liquid receiving portion and a steam receiving compartment in communication with the liquid receiving portion and arranged so that the steam will pass in contact with the liquid therein, the vapor and liquid contact devices being positioned within the column so that the oil will be received in the liquid receiving portion in one of the devices and passed serially through the other devices, means through which steam is conducted in parallel to the steam receiving compartments of the contact devices, said column having a passage therethrough in which steam flows after passing through the contact devices, and recycling means for withdrawing at least part of the steam from the column after passage thereof through the contact devices and returning the steam to said devices in admixture with the steam first-mentioned.

7. Apparatus for stripping volatile substances from a liquid comprising a column, means for introducing liquid to be stripped into the column, vapor and liquid contact devices in which vapor and liquid pass in contact with each other, said devices being so positioned within the column that the liquid will flow serially therethrough, a stem jet having its suction in communication with the column to withdraw at least part of the steam after contact with the liquid, the discharge of the jet being in communication in parallel with the vapor and liquid contact devices to discharge said vapor thereinto, the column having a passage therethrough in which steam flows after passing through the contact devices, and means through which steam is introduced into the steam jet.

8. Apparatus for stripping volatile substances from a liquid comprising a column, means for introducing liquid to be stripped into the column, vapor and liquid contact devices in which vapor and liquid pass in contact with each other, said devices being so positioned within the column that liquid will flow serially therethrough, a compressor having its suction in communication with the column to withdraw at least part of the steam after contact with the liquid, the discharge of the compressor being in communication in parallel with the vapor and liquid contact devices to discharge said vapor thereinto, said column having a passage therethrough in which steam flows after passing through the contact devices, and means for passing steam into the vapor and liquid contact devices in admixture with the discharged steam from the compressor.

9. Apparatus for stripping volatile substances from a liquid comprising a column, means for introducing a liquid to be stripped into the column, vapor and liquid contact devices extending laterally in the column to a point short of the inner wall thereof, said devices being so constructed and arranged that liquid will flow serially therethrough, means through which steam is passed to the contact devices in parallel, and recycling means for withdrawing at least part of the steam from the column after passage thereof through the contact devices and for returning the same to said devices in admixture with the steam first-mentioned.

10. Apparatus for the continuous deodorization of animal and vegetable oils comprising a column, means for producing and maintaining a vacuum in the column, said column having a pressure drop therethrough, means for continuously introducing oil into the upper part of the column, vapor and liquid contact devices extending laterally in the column to a point short of the inner wall thereof, said devices being so constructed and arranged that oil will flow serially therethrough, means through which steam is passed to the contact devices in parallel to flow countercurrent and in contact with the oil in the contact devices, and recycling means for withdrawing at least part of the steam from the column after passage thereof through the contact devices and for returning the withdrawn steam to said devices in admixture with the steam first-mentioned.

11. Apparatus for stripping volatile substances from a liquid comprising an upright column, vapor and liquid contact means in the column intermediate the top and bottom thereof, means for introducing liquid to be stripped into the column above said vapor and liquid contact means so as to flow downwardly through the contact means, means for introducing a stripping medium into the contact means so as to flow upwardly through the contact means and in contact with said liquid, stripping medium withdrawal means in communication with the column above the vapor and liquid contact means, and recycling means having an inlet into which fluid is drawn and an outlet through which said fluid is discharged, the inlet being in communication with the column at such point below said withdrawal means as to receive some of the stripping medium after passage through at least a portion of said contact means and the outlet being in communication with the column at such other point below the first-mentioned point as to discharge said some of the stripping medium to pass through the contact means.

12. Apparatus for stripping volatile substances from a liquid comprising an upright column, vapor and liquid contact means in the column intermediate the top and bottom thereof, means for introducing liquid to be stripped into the column above said vapor and liquid contact means so as to flow downwardly through the contact means, means for introducing a stripping medium into the contact means so as to flow upwardly through the contact means and in contact with said liquid, vacuum producing stripping medium withdrawal means having an inlet in communication with the column above said vapor and liquid contact means, and recycling means having an inlet into which fluid is drawn and an outlet through which said fluid is discharged, the inlet being in communication with the column at such point below said withdrawal means as to receive some of the stripping medium after passage through at least a portion of said contact means and the outlet being in communication with the column at such other point below the first-mentioned point as to discharge said some of the stripping medium to pass through the contact means.

13. Apparatus for stripping volatile substances from a liquid comprising an upright column, vapor and liquid contact means in the column intermediate the top and bottom thereof, means for introducing liquid to be stripped into the upper part of the column so as to flow downwardly through the contact means, means for introducing a stripping medium into the lower part of the column so as to flow upwardly through the contact means and in contact with said liquid, stripping medium withdrawal means in communication with the column above the vapor and liquid contact means, and recycling means having an inlet into which fluid is drawn and an outlet through which said fluid is discharged, the inlet being in communication with the upper part of the column above said contact means and the outlet being in communication with the lower part of the column below said contact means.

14. Apparatus for continuously stripping volatile substances from a liquid comprising an upright column, vapor and liquid contact means in the column intermediate the top and bottom thereof, means for introducing liquid to be stripped into the column above said vapor and liquid contact means so as to flow downwardly through the contact means, means for introducing a stripping medium into the contact means so as to flow upwardly through the contact means and in contact with said liquid, stripping medium withdrawal means in communication with the column above the vapor and liquid contact means, and recycling means having an inlet into which fluid is drawn and an outlet through which said fluid is discharged, the inlet being in communication with the column at such point below said withdrawal means as to receive some of the stripping medium after passage through at least a portion of said contact means and the outlet being in communication with the column at such other point below the first-mentioned point as to discharge said some of the stripping medium to pass through the contact means.

15. Apparatus for the continuous deodorization of animal and vegetable oils comprising an upright column, vapor and liquid contact devices positioned intermediate the top and bottom thereof, means for continuously introducing oil into the upper part of the column above said vapor and liquid contact devices so as to flow downwardly through the devices, means for introducing stripping steam into the column below the contact devices so as to flow upwardly through said devices and in contact with the oil, stripping steam withdrawal means in communication with the column above the contact devices, and recycling means having an inlet into which steam is drawn and an outlet through which said steam is discharged, the inlet being in communication with the column intermediate the point of introduction of oil and the point of introduction of steam thereinto and the outlet being in communication with the lower part of the column so as to discharge steam to pass through the contact devices.

16. Apparatus for continuous deodorization of animal and vegetable oils comprising an upright column, vapor and liquid contact devices positioned intermediate the top and bottom thereof, means for continuously introducing oil into the upper part of the column above said vapor and liquid contact devices so as to flow downwardly through the devices, means for introducing stripping steam into the column below the contact devices so as to flow upwardly through said devices and in contact with the oil, vacuum producing steam withdrawal means having an inlet in communication with the column above said vapor and liquid contact devices, and recycling means having an inlet into which steam is drawn and an outlet through which said steam is discharged, the inlet being in communication with the column intermediate the point of introduction of oil and the point of introduction of steam thereinto and the outlet being in communication with the lower part of the column so as to discharge steam to pass through the contact devices.

17. Apparatus for the continuous deodorization of animal and vegetable oils comprising an upright column, vapor and liquid contact devices positioned intermediate the top and bottom thereof, means for continuously introducing oil into the upper part of the column above said vapor and liquid contact devices so as to flow downwardly through the devices, vacuum producing steam withdrawal means having an inlet in communication with the column above said vapor and liquid contact devices, a steam jet having its discharge in communication with the column adjacent the bottom thereof and its suction in communication with the column intermediate the top and bottom thereof so as to receive stripping steam therefrom, and means through which steam is introduced into the steam jet.

DION K. DEAN.

REFERENCES CITED

The following references are of record in the file of this patent:

UNITED STATES PATENTS

| Number | Name | Date |
|---|---|---|
| 297,603 | Huston | Apr. 29, 1884 |
| 1,592,112 | Lamay-Torrilhon | July 13, 1926 |
| 1,662,105 | Doherty | Mar. 13, 1928 |
| 1,725,925 | Kent | Aug. 27, 1929 |
| 1,754,598 | Bollman | Apr. 15, 1930 |
| 1,771,561 | Genseche | July 29, 1930 |
| 2,057,004 | Burkhard | Oct. 13, 1936 |
| 2,124,707 | Newton | July 26, 1938 |
| 2,205,090 | Gard | June 18, 1940 |
| 2,280,896 | Dean | Apr. 28, 1942 |
| 2,324,955 | Rupp | July 20, 1943 |

FOREIGN PATENTS

| Number | Country | Date |
|---|---|---|
| 16,954 | Great Britain | 1892 |
| 222,093 | Great Britain | May 7, 1925 |
| 240,878 | Germany | Nov. 20, 1911 |